United States Patent [19]
Dalhart et al.

[11] Patent Number: 5,653,261
[45] Date of Patent: Aug. 5, 1997

[54] SELECTOR VALVE

[75] Inventors: Mark D. Dalhart, Mason; Ralph F. Gessner, Jr., Cincinnati, both of Ohio

[73] Assignee: Hydro Systems Company, Cincinnati, Ohio

[21] Appl. No.: 673,332

[22] Filed: Jun. 28, 1996

[51] Int. Cl.⁶ .................................................. E03B 5/00
[52] U.S. Cl. ............... 137/893; 137/625.11; 137/625.41
[58] Field of Search ........................... 137/893, 325.11, 137/325.41, 895, 891, 892, 894, 888, 889; 417/76, 151, 176

[56] References Cited

U.S. PATENT DOCUMENTS

| | | |
|---|---|---|
| 2,455,625 | 2/1945 | Trantin, Jr. . |
| 2,649,113 | 8/1953 | Cizek . |
| 2,912,001 | 11/1959 | Burg . |
| 2,924,207 | 2/1960 | Hottenroth . |
| 3,067,768 | 12/1962 | Burg . |
| 3,072,137 | 1/1963 | McDougall . |
| 3,089,505 | 5/1963 | Forster . |
| 3,166,086 | 1/1965 | Holmes . |
| 3,167,091 | 1/1965 | Holdren ................... 137/893 |
| 3,240,230 | 3/1966 | Callahan, Jr. et al. . |
| 3,256,909 | 6/1966 | Obidniak et al. . |
| 3,443,592 | 5/1969 | Felmlee . |
| 3,586,049 | 6/1971 | Adamson . |
| 3,687,163 | 8/1972 | Nickels . |
| 3,762,439 | 10/1973 | Heath . |
| 3,810,787 | 5/1974 | Yoeli et al. . |
| 3,837,360 | 9/1974 | Bubula . |
| 3,940,107 | 2/1976 | Allenbaugh, Jr. . |
| 3,957,082 | 5/1976 | Fuson et al. . |
| 4,130,128 | 12/1978 | Kaneko . |
| 4,178,963 | 12/1979 | Riefler et al. . |
| 4,241,896 | 12/1980 | Voege . |
| 4,276,001 | 6/1981 | Holmes . |
| 4,407,444 | 10/1983 | Knebel et al. . |
| 4,427,176 | 1/1984 | Livet . |
| 4,446,887 | 5/1984 | Redmon et al. . |
| 4,538,636 | 9/1985 | Cleland . |
| 4,643,215 | 2/1987 | Philpot et al. . |
| 4,655,246 | 4/1987 | Philpot et al. . |
| 4,794,950 | 1/1989 | Gratzmuller . |
| 4,815,634 | 3/1989 | Nowicki . |
| 4,934,651 | 6/1990 | Nowicki . |
| 5,069,245 | 12/1991 | Potter ...................... 137/893 |
| 5,123,449 | 6/1992 | Nowicki . |
| 5,377,718 | 1/1995 | Sand . |
| 5,509,349 | 4/1996 | Anderson ................. 137/893 |

*Primary Examiner*—Denise L. Ferensic
*Assistant Examiner*—Ramyar M. Farid
*Attorney, Agent, or Firm*—Wood, Herron & Evans, L.L.P.

[57] ABSTRACT

An improved selector valve includes a sealing disc with a sealing face biased against an opposed sealing face of a port plate. The sealing disc has a channel located in the sealing face which communicates with an outlet port and a single selected inlet port on the port plate while simultaneously sealing off all other inlet ports. A venturi eductor has a suction passage sealed directly to the port plate outlet for connecting the venturi directly to a selected inlet port. A connection bridge spans a tolerance gap between the port plate to the eductor. The flow path of the fluid through the selector valve has been streamlined to eliminate stagnation points and minimize turbulent flow of the fluid. As a result, the dilution rate of the chemical and water being dispensed upon actuation of the valve is improved and purging of the selector valve is eliminated because the amount of residual chemical remaining in the selector valve is minimized. Moreover, the material selection of the sealing disc enables a wider temperature range of operation for the selector valve without thermal expansion or contraction which may detrimentally effect the seals between the adjacent proponents of the selector valve.

9 Claims, 3 Drawing Sheets

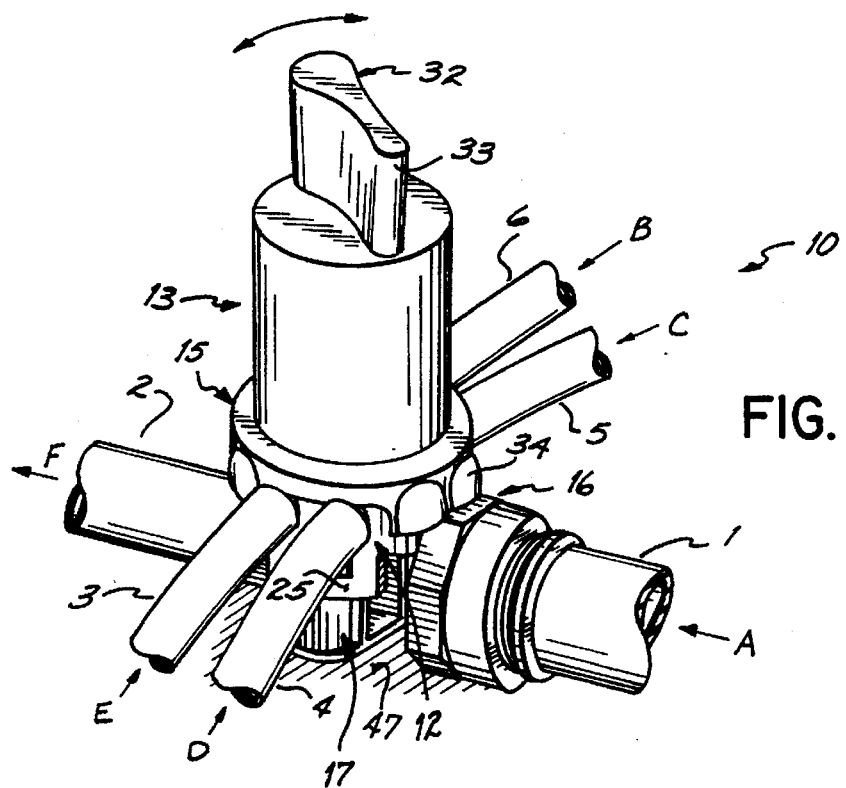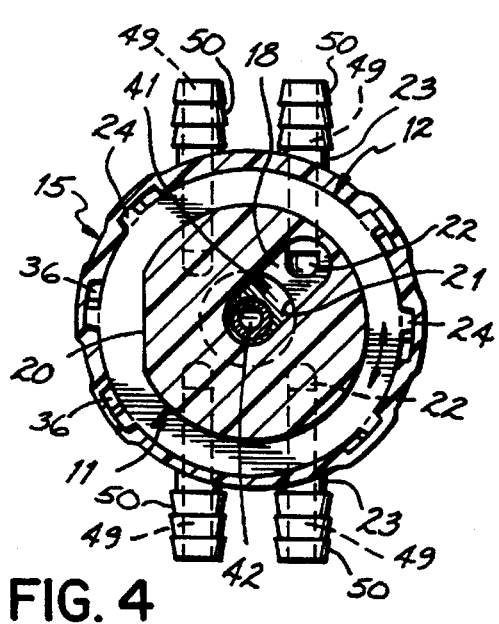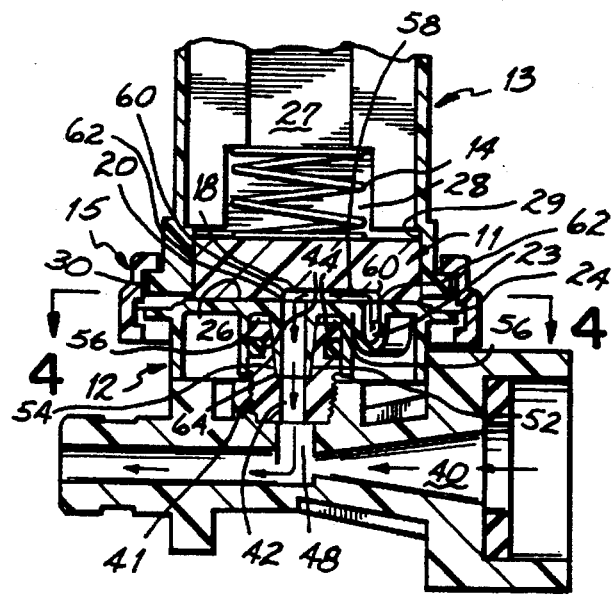

SELECTOR VALVE

BACKGROUND OF THE INVENTION

This invention relates to dispensers and more particularly to a selector valve for selection of one of a plurality of fluids for dispensing or mixing with another fluid through a venturi eductor system.

Selector valves of this type typically allow an operator to select and dispense one particular chemical or fluid at a time, while closing off access to all of the other fluid sources available for selection. One such prior selector valve typically included a static body having several inlet ports and one outlet port and a rotatable valve core with passages to allow selective connection of a selected inlet port with the outlet port. Sealing of the non-selected inlet ports was provided by a spring loaded, O-ring sealed plunger carried in the rotatable core and bearing against the face of the static body. While selector valves of this type allow for selective connection and dispensing of a plurality of fluids, they have several inherent disadvantages.

One problem associated with materials typically used in selector valves of this type is the response of the materials to a wide range of temperatures. Selector valves heretofore have been inherently limited to operating environments above a certain temperature due to the limited sealing force supplied by the spring and the propensity for the materials to thermally expand and contract outside of a limited operating temperature. The interference fit and mating relationship between the various components of the selector valve are critically important to the effective sealing of nonselected input fluids. As a result, prior selector valves have been limited to a narrow operating temperature range to avoid thermal expansion and contraction which detrimentally effects the various seals.

Another important aspect of selector valves of this type is the ability to efficiently change over from one selected input chemical or fluid to another. A residual volume of the prior chemical in many systems of this type must be purged prior to inputting a second selected chemical or fluid. Purging the system is very detrimental in that it requires delays in the operation and diminishes the accuracy of the volume and timing of the mixing of the fluids. Because of the distance and the geometry of the path the selected fluid must travel within the selector valve system, the system may contain a significant amount of residual chemical after the user has selected a new inlet port, thereby requiring the user to spend time purging the line.

A contributing factor to the problem of residual fluids in the selector valve is turbulent flow of the fluids through the selector valve. Specifically, the cause of turbulent flow in the selected fluid flow path is commonly stagnation points or blind spots which are typically found at the juncture between mating components. These areas create turbulent flow of the fluid through the selector valve and minimize the ability to effectively purge the valve and flush the residual chemicals. Additionally, turbulent flow through the selector valve retards the fluid flow and requires greater pressures and timing problems for the selected input fluid sources and responsiveness of the selector valve and connected system components.

One solution to some of these identified problems is disclosed in U.S. Pat. No. 5,377,718 which is assigned to the assignee of the present invention and which is hereby expressly incorporated herein by reference. The system of that patent includes a sealing disc with a sealing face biased against an opposed sealing face of a port plate. The sealing disc includes a radially disposed channel located in the sealing face which communicates with an outlet port and a single selected inlet port on the port plate while the sealing disc simultaneously seals off all other inlet ports. A venturi eductor has a suction passage sealed directly to the port plate outlet for connecting the venturi directly to the selected inlet port.

While the system disclosed in U.S. Pat. No. 5,377,718 solved a number of problems associated with prior selector valves, that system was directed to reducing the volume of internal passages within the valve in order to shorten the selected fluid flow path and minimize the residual chemical from a previously selected inlet port when another chemical is chosen. However, the reduction of volume in the internal passages of the selector valve, while providing a successful solution, only addressed one aspect of the problem of residual chemical in the system. The particular geometry of the selected fluid flow path through the selector valve is another contributing factor for residual chemical of fluid. Specifically, crevices between mating components and sharp corners or blind spots in the flow path of the fluid through the selector valve provide areas for the fluid to accumulate even after another fluid has been selected. One such area is a tolerance gap between the selector valve and the eductor to which the valve is connected for fluid flow between these components. This gap is designed into the system to allow for the components to be easily assembled and disassemble as required.

The tolerance gap and other crevices provide potential fluid pathways to crevices between parts and potential areas for leakage of the fluids. Also, the nature and structure of the interface between the port plate of the valve and the eductor plug left certain dead spaces or blind spots in which prior selected chemicals might reside, requiring efficient purge cycles between consecutive fluid selections. Moreover, the selection of a different fluid interrupts flow through the valve and subsequently generates turbulent flow while the crevices and blind spots are filled and flow is not initially at a steady state condition.

BRIEF SUMMARY OF THE INVENTION

Accordingly, it has been one objective of this invention to provide an improved selector valve.

A further objective of the invention has been to provide such a selector valve which greatly minimizes the amount of residual chemical in the valve or valve systems when a subsequent inlet chemical is selected.

Another objective has been to provide such a selector valve with an improved fluid flow path that allows for non-turbulent steady state flow more quickly upon fluid selection and more accurate fluid dilution in each operating cycle.

A still further objective of this invention has been to provide such a selector valve which is effective over a wider range of operating conditions and temperatures than previously known valve systems.

To these ends, a preferred embodiment of the present invention contemplates an improvement in the structure of parts defining the selected fluid flow path in a selector valve such as that shown in U.S. Pat. No. 5,377,718.

In the preferred embodiment of the invention the port plate of the selector valve is improved and includes a connection bridge effectively defining a chemical path into and partially through an eductor plug and effectively sealing the port plate to the plug. This port plate structure effectively defines, in part, a smooth low volume chemical path from the inlet into and through the eductor plug all without blind spots or areas for the chemical to collect and create turbulent flow. Furthermore, a circumferential interference fit or seal is formed between the conical shaped connection bridge on the port plate and the mating sidewall of the conical shaped recess in the eductor plug to preclude chemical migration into crevices between these components.

The present structure utilizes a tolerance gap to prevent the eductor plug from interfering with the seal between the port plate and sealing disc; however, the tolerance gap is accommodated between the eductor plug and the port plate in an area outside the chemical path so that the tolerance gap does not create any blind spots or stagnation points. The conically shaped connection bridge spans the tolerance gap to allow for sealing against vacuum and prevent the selected chemicals from entering the tolerance gap.

To increase the operating range of the selector valve, the sealing disc material is 15% glass filled polytetrafluoroethylene (PTFE) that is compression molded to provide dimensional stability of the sealing face at a wide range of temperature and humidity conditions. Prior systems were inherently limited to operating environments of 65° F. or above due to the limited sealing force supplied by the spring and the propensity for prior materials to thermally expand and contract near this temperature. As a result, the selector valve according to this invention can be reliably used at lower temperatures below 65° F. without such performance problems.

These and other objectives and advantages will become readily apparent from the following detailed description of a preferred embodiment of the invention and from the drawings in which:

BRIEF DESCRIPTION OF DRAWINGS

FIG. 1 is a perspective view of a selector valve and eductor assembly according to a presently preferred embodiment of the invention;

FIG. 3 is a cross-sectional side view of the preferred embodiment of FIG. 1;

FIG. 4 is a cross-sectional view taken along line 4—4 of FIG. 3; and

DETAILED DESCRIPTION OF THE INVENTION

Figure 2:
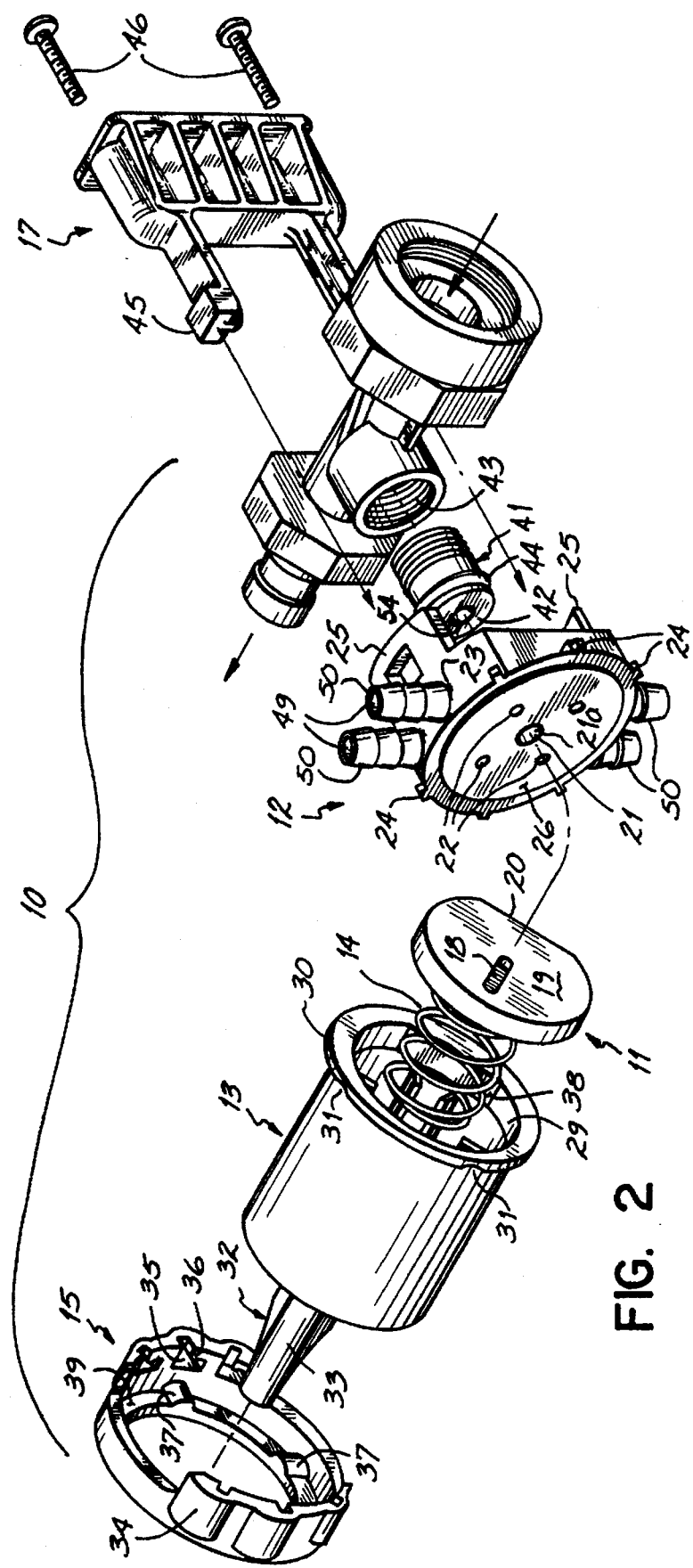
FIG. 2 is an exploded view of the component parts of the selector valve and eductor assembly of FIG. 1.

A selector valve 10 according to a presently preferred embodiment of the invention is illustrated in FIG. 1. The selector valve 10 is disposed in a dispensing or proportioning system including a water inlet or hose 1 and a discharge outlet hose 2 which are connected to respective ends of a venturi eductor 16 as will be described later herein.

The selector valve 10 is operably connected through input lines 3, 4, 5, 6 to respective sources of chemicals or fluids to be selected and proportioned by venturi action for discharge through the outlet hose 2. In FIG. 1, arrow A indicates an incoming flow of water or fluid into inlet 1 and arrows B, C, D, and E indicate flow of chemicals or fluids into selector valve 10 and arrow F indicates the discharge flow of water or fluid combined with one of the chemicals represented by flow arrows B, C, D, or E.

It will be appreciated that a fluid other than water may be used for inlet 1 to draw input chemicals or fluids through a selected input line 3–6 and intermixed therewith for passage to discharge line 2. The actual flow of fluid in inlet 1 may be controlled by separate valve means (not shown). Moreover, it will be appreciated that the selected chemicals may be measured or proportioned by means of orifices disposed of the chemical sources in the input lines 3–6 or in the selector valve 10.

Referring to the more detailed views of the selector valve 10 in FIGS. 2–5, the selector valve 10 includes a sealing disc 11, a valve port plate 12, a rotatable knob 14, a retaining ring 15, an eductor 16, and a bracket 17.

Specifically, the sealing disc 11 and associated components are shown in FIG. 2. The sealing disc 11 is preferably flat with a circular edge or periphery 11a. Sealing disc 11 includes a recessed line slot or channel 18 disposed in a sealing face 19 and an edge flat 20 disposed in the otherwise circular periphery 11a. According to a presently preferred embodiment of the invention, the sealing disc 11 is manufactured from glass fiber filled and compression molded polytetraflouroethylene (PTFE). Most preferably, the sealing disc is 15% glass filled PTFE to provide dimensional stability of the sealing disc 11 at a wide range of temperature and humidity conditions. Specifically, the sealing disc 11 of this invention has performed successfully over a temperature range of about 40° F. to about 120° F. and normalizes temperature response characteristics of the sealing disc 11.

The valve port plate 12 includes a central outlet 21 and outlet passage 21a and several inlet ports 22 radially oriented with respect to the outlet port 21. The outlet port 21 is located at the terminal end of a conical shaped connection bridge 52 which extends from a face of the port plate 12 opposite from a flat face 26 of the port plate 12. The inlet ports 22 communicate with peripheral ports 23 located on the periphery of the valve port plate 12 through inlet passages 49 (FIG. 4). The valve port plate 12 further includes lugs 24 extending radially from the periphery of the port plate 12, locking flanges 25 for securing the valve port plate 12 to a bracket 17, and a ported flat face 26 disposed against the sealing face 19 of the sealing disc 11. In a presently preferred embodiment, the port plate 12 is manufactured with reinforced polypropylene. The use of glass filled PTFE and reinforced polypropylene in the valve disc 11 and port plate 12, respectively, provides good chemical resistance and good sealing with smooth valve movement at the fluid suction pressures used, generally in the range of 14 psi, but which may vary. Additionally, these preferred materials provide excellent temperature compensation characteristics to resist contraction and expansion of the component parts at a temperature range of about 40° F. to about 120° F.

When the sealing disc 11 is disposed upon the valve port plate 12, it allows selective communication of a selector inlet port 22 with the central outlet port 21, while sealing off the remaining nonselected inlet ports. The selector valve 10 further includes a rotatable knob 13 and a biasing means or spring 14. The knob 13 is manually operated to rotate the sealing disc 11 on the valve port plate 12 to select a particular inlet port 22.

The rotatable knob 13 has a hollow interior 27, a spring housing 28, and a disc receiving recess 29 (FIGS. 2 and 3). The disc receiving recess 29 includes a flat 38 that cooperates with the sealing disc peripheral edge flat 20 thereby allowing the user to turn the sealing disc 11 by rotating the knob 13.

The rotatable knob 13 further includes a radially projecting external flange 30 having an upper surface with depressions 31. A handle 32 is provided for grasping and rotating the knob 13. The handle 32 has a tapered end 33 (FIG. 1) which is always aligned with the channel 18 in the sealing disk 11. Therefore, the tapered end 33 will always point toward the selected inlet port 22. In other words, the tapered end 33 always points radially in the same angular direction as the radial extension of the channel 18. This is perhaps best illustrated in FIG. 2 where the orientation of handle 32 and of channel 18 can be compared.

The selector valve 10 also includes a retaining ring 15. The retaining ring 15 has a depending skirt 34 with an internal surface which includes several locking channels including recesses 35 and protrusions 36. The retaining ring 15 also includes a radially inwardly extending rim surface 39 with several radially oriented protrusions 37 (FIG. 2). The skirt 34 depends from an outer periphery of the rim surface 39.

The interior rim surface 39 of the retaining ring 15 sits on the external flange 30 of the rotatable knob 13 when the selector valve 10 is assembled. Lugs 24 on the port plate 12 are received within recesses 35 on the retaining ring skirt 34 interlocked by protrusions 36. When assembled in this manner, the ring 15 holds the rotatable knob 13 on the valve port plate 12.

The projections 37 on ring 15 are spaced so as to be aligned with the depressions 31 on the upper surface of flange 30 at the base of the rotatable knob 13 thereby creating a detenting action as the rotatable knob 13 is turned as shown in FIG. 2. When the projections 37 align with the depressions 31, the detenting action is created and the user knows that the channel 18 on the sealing disc 11 is angularly aligned over one of the inlet ports 22 on the valve port plate 12 and the central outlet port 21 as shown in FIG. 4.

The seal between the sealing disk 11 and the valve port plate 12 is created by the spring 14. In a presently preferred embodiment of the invention, the spring 14 is situated in the spring housing 28 thereby creating an opposing and outwardly directed biasing force against the sealing disc 11. The sealing disc 11 is axially movable in recess 29 so that it could be urged outwardly of knob 13. Moreover, it will be appreciated that the spring force against the sealing disc 11 not only serves to operably seal it against port plate 12, but to urge the knob 13 away from the port plate 12 so that the projections 37 are urged releasably into the depressions 31 on the knob flange 30. This provides a suitable tactual detent as previously described.

It will also be appreciated that the disc flat 20, flat 38 and recess 29, the detents, and the angular disposition of handle 32 and channel 18 are all indexed with the angular position of the inlet ports 22 to provide a positive detent to position the valve when a particular port is selected with the rotation of knob 13. Of course the position of lugs 24 on the port plate 12 and the locking channels having recesses 35 on the retaining ring 15 are likewise indexed to ensure proper port alignment at the detent positions.

A presently preferred embodiment of the invention also includes an eductor assembly 16 mounted directly to the connection bridge 52 on the port plate 12. A bracket 17 is used to secure the eductor 16 to the valve port plate 12. The eductor 16 has a venturi 40 as shown in FIGS. 2 and 3 and an eductor plug 41 with an orifice or passage 42. The plug 41 and orifice 42 define in part a venturi suction passage 48. The base of the eductor plug 41 is threaded and fits into a threaded eductor socket 43 on the side of the eductor 16. The opposite end of the eductor plug 41 has a rubber seal 44 around the periphery thereof to create a seal between the eductor plug 41 and the central outlet port 21 in valve port plate 12. In a preferred embodiment of the invention, the eductor 16 and venturi 40 will create a suction with an eductor pressure of approximately 14 psi. The connection bridge 52 is received in a mating conical recess 54 in the eductor plug 41. The resulting interference fit between the connection bridge 52 and the eductor plug 41 forms a seal between the valve port plate 12 and the eductor assembly 16.

Figure 5:
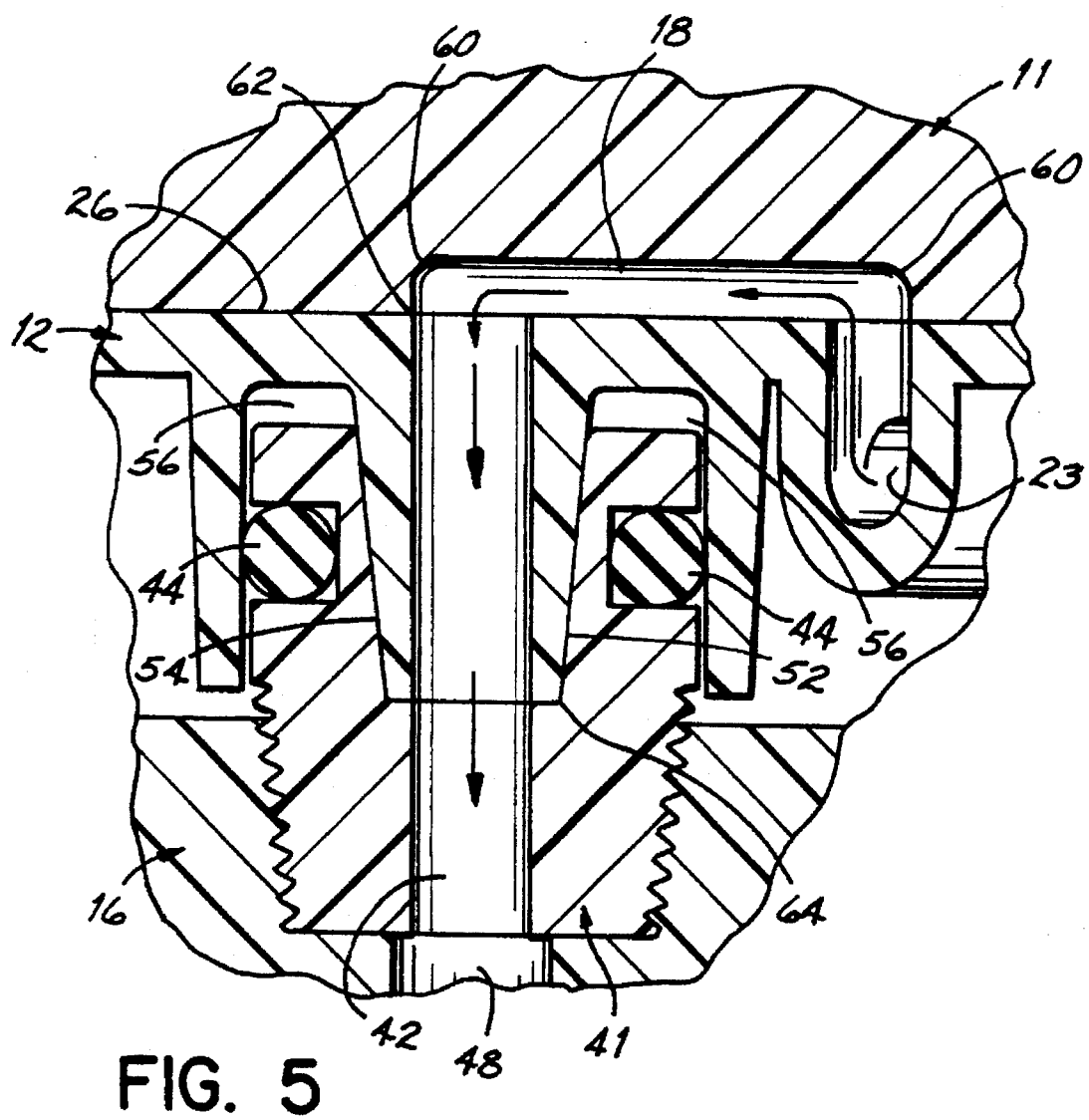
FIG. 5 is an enlarged view of a connection bridge between the port plate and educator plug of FIG. 4.

The selector valve 10 includes the bracket 17 which couples to the valve port plate 12 thereby securing the eductor 16 to the valve port plate 12. The bracket 17 has resilient locking arms with projections 45 which engage the openings on locking flanges 25 on the valve port plate 12. Screws 46 may be used to releasably secure and mount the eductor 16 to selector valve 10 on a mounting surface 47 (FIG. 1). As shown in FIGS. 4 and 5, when the eductor 16 is assembled in this manner with the selector valve 10, a tolerance gap 56 is provided between the mating surfaces of the plug 41 of the eductor 16 and the port plate 12. The connection bridge 52 is an annular tapered member and spans the tolerance gap 56 thereby providing for direct passage of the selected inlet fluid through the outlet port 21 without entering the tolerance gap 56.

As a result of the sealing engagement between the flat faces of the sealing disk 11 and the valve port plate 12, there is no need for the use of additional O-rings or sealed components. A seal is created by directly biasing the sealing disk 11 against the ported face 26 of the valve port plate 12.

In use, the selector valve user will select a particular inlet port 22 by turning the rotatable knob 13 and orienting the tapered end 33 of the handle 32 toward one of the peripheral ports 23 on the valve port plate 12. This action will move the channel 18 over the selected inlet port associated with the corresponding inlet while simultaneously sealing off the nonselected inlet ports 22 on the ported face 26 of the valve port plate 12. The selected inlet port 22 and the central outlet port 21 communicate through the channel 18 in the sealing face 19 of the sealing disc 11 as shown particularly in FIGS. 2, 4 and 5.

When water or other fluid flows into the eductor 16 and through the venturi passage 40, a pressure drop is created in venturi suction passage 48. This suction is communicated through the passage 48 and passage 41 to outlet port 21 and subsequently through channel 18 to the selected chemical source for pulling that chemical into the venturi passage 48 for mixing and discharge.

In use, a chemical or other fluid will be drawn up through the selected peripheral port 23 which communicates with the selected inlet port 22 via the selected inlet passage 49 (FIGS. 2 and 4). In a presently preferred embodiment of the invention, the peripheral ports 23 will connect with the source chemicals or fluids through the use of hoses 3, 4, 5, 6 from the sources connected with hose connection barbs 50. The user will know that the chosen inlet port 22 is properly selected because of the detenting action created between the depressions 31 at the base of the rotatable knob 13 and the projection 37 along the interior rim surface 39 of the retaining rim 15, The depressions 31 and protrusions 37 will create a positive detent when they are in alignment. This will signal to the user that the channel 18 and the sealing disc 11 is properly aligned with the selected inlet port 22 on the valve port plate 12.

Another advantage of the selector valve 10 according to this invention is the removal of stagnation points such as blind spots, corners, or the like in the flow path of the inlet fluid through the selector valve 10 and into the eductor 16. Removal of the stagnation points significantly streamlines the flow of the fluid through the selector valve to facilitate an almost immediate steady state of flow once the input fluid is selected by the user. As such, areas for the chemical to gather and stagnate during operation of the selector valve 10 are significantly reduced and/or minimized. As a result, the turbulent chemical flow through the valve 10 has been eliminated thereby improving the instantaneous dilution rate of the chemical and water being dispensed upon actuation of the valve 10. Specifically, the walls 58 of the channel 18 in the sealing disk 11 are generally planar and joined by rounded fillets 60 thereby eliminating the stagnation points and corners or crevices in the channel 18. Furthermore, the interface 62 between mating surfaces of the sealing disc 11 and the valve port plate 12 and the interface 64 between the connection bridge 52 and the eductor plug 41 are smooth and continuous to promote laminar flow of the fluid from one adjacent component to the next.

Additionally, the conical shaped connection bridge 52 which extends into the conical shaped recess 54 in the eductor plug 41 directs the chemical flow. The circumferential interference fit between the eductor plug 41 and the connection bridge 52 forms a seal to preclude chemical migration into crevices between these components. As a result of the selector valve 10 according to a presently preferred embodiment of the invention, a residual amount of chemical retained in the selector valve 10 is reduced from approximately 0.4 cc in prior art valves to below 0.1 cc according to this invention. Therefore, retained chemicals no longer need to be purged because they have been almost entirely eliminated from the selector valve 10.

Moreover, the reduction and elimination of stagnation points enables the flow of the chemicals through the selector valve 10 and the eductor 16 to achieve steady state flow conditions almost immediately once the new input chemical is selected. The smooth interfaces 62, 64 and the elimination of cavities or crevices in the selected fluid flow path avoid stagnation points in the flow path. Moreover, chemical dilution ratios are more accurate since the newly selected chemical is dispensed without hesitation or delay. Bridging the tolerance gap 56 with the connection bridge 52 and providing a seal between the eductor plug 41 and the port plate 12 provides an unobstructed flow path with minimal pressure drop between these components. Since vacuum is pulling the chemical forward, the seal requires only an interference fit to prevent chemical from entering any remaining crevices and the tolerance gap 56 between the components.

These and other advantages and modifications will become readily apparent to those of ordinary skill in the art without departing from the scope of this invention. The applicant intends to be bound only by the scope of the claims which follow and equivalents thereof.

We claim:

1. A selector valve comprising:

a port plate having a flat face;

a connection bridge projecting from said port plate, said connection bridge defining an outlet port;

an eductor assembly having an inlet recess receiving therein said connection bridge;

at least two inlet ports in said face, said inlet ports being disposed about said outlet port;

a sealing disc having a flat sealing face for disposition in engagement with said port plate flat face, said flat sealing face of said sealing disc engaging and sealing against said port plate face, said sealing disc being rotatable about an axis;

a knob for rotating said disc about said axis, said disc being operably engaged by said knob for rotation and said disc being movable with respect to said knob in a direction parallel to said axis; and a channel in said sealing face extending radially outward in said face with respect to said axis;

wherein said disc is rotatable with respect to said port plate for interconnecting a first selected inlet port with said outlet port through said channel to permit a first fluid to flow through said first selected inlet port, out said outlet port and into said eductor assembly while other inlet ports are blocked by said flat sealing face of said sealing disc, said connection bridge minimizing a residual amount of said first fluid in said outlet port when said disc is rotated for interconnecting a second selected inlet port with said outlet port to permit a second fluid to flow into said eductor assembly.

2. The selector valve of claim 1 further comprising:

a selected fluid flow path to direct a selected fluid from any one of said inlet ports through said port plate, into said channel in said sealing disc, through said connection bridge, out said outlet port and into said eductor assembly, said selected fluid flow path being streamlined without stagnation points to provide steady state flow and minimize turbulent flow upon interconnection of said second selected inlet port with said outlet port.

3. The selector valve of claim 2 wherein said channel in said sealing disc comprises planar surfaces joined by fillets and adjacent components along said selected fluid flow path have smoothly continuous mating surfaces.

4. The selector valve of claim 1 wherein said connection bridge comprises a conical shaped extension projecting from a face of said port plate opposite from said flat face, said conical shaped extension having an annular duct therethrough terminating at said outlet port and said eductor assembly inlet recess comprises a conical shaped recess to mate with said conical shaped extension, said conical shaped extension forming a circumferential contact seal with a sidewall of said conical shaped recess.

5. The selector valve of claim 1 wherein said sealing disc is glass filled PTFE to minimize thermal expansion and contraction of said sealing disc for operation below 65° F.

6. The selector valve of claim 1 wherein said residual amount of said first fluid is less than 0.1 cc.

7. The selector valve of claim 1 wherein said connection bridge spans a tolerance gap between said port plate and said eductor assembly to prevent fluid flowing through said connection bridge from entering said tolerance gap.

8. A selector valve comprising:

a port plate having a flat face;

a conical shaped connection bridge projecting from said port plate opposite from said flat face, said connection bridge defining an outlet port;

an eductor assembly having a conical shaped recess receiving therein said connection bridge;

at least two inlet ports in said face, said inlet ports being disposed about said outlet port;

a sealing disc having a flat sealing face for disposition in engagement with said port plate flat face, said flat sealing face of said sealing disc engaging and sealing against said port plate face, said sealing disc being rotatable about an axis;

a knob for rotating said disc about said axis, said disc being operably engaged by said knob for rotation and said disc being movable with respect to said knob in a direction parallel to said axis;

a channel in said sealing face extending radially outward in said face with respect to said axis, said channel in said sealing disc comprising planar surfaces joined by fillets;

wherein said disc is rotatable with respect to said port plate for interconnecting a first selected inlet port with said outlet port through said channel to permit a first fluid to flow through said first selected inlet port, said outlet port and into said eductor assembly while other inlet ports are blocked by said flat sealing face of said sealing disc, said connection bridge minimizing a residual amount of said first fluid in said outlet port when said disc is rotated for interconnecting a second selected inlet port with said outlet port to permit a second fluid to flow into said eductor assembly;

a selected fluid flow path to direct a selected fluid from any one of said inlet ports through said port plate, into said channel in said sealing disc, through said connection bridge, out said outlet port and into said eductor assembly, said selected fluid flow path being streamlined without stagnation points to provide steady state flow and minimize turbulent flow upon interconnection of said second selected inlet port with said outlet port;

wherein adjacent components along said selected fluid flow path have smoothly continuous mating surfaces; and a tolerance gap between said port plate and said eductor assembly, said connection bridge preventing fluid flowing through said selected fluid flow path from entering said tolerance gap.

9. A selector valve which permits sequential selection of one of a plurality of fluids to flow through said selector valve and into a venturi eductor plug via a selected fluid passage for mixing with an input fluid at a location downstream of said venturi eductor plug in said selected fluid passage, said selected fluid passage having smoothly continuous surfaces with no dead spaces, said selector valve being removably coupled to said venturi eductor plug via a connection bridge being integrally formed with said selector valve and which mates with a socket in said venturi eductor plug, said connection bridge and said socket having a passage therethrough for said selected fluid to pass from said selector valve to said venturi eductor plug through said selected fluid passage without turbulent flow while minimizing a residual amount of said selected fluid in said passage once another of said fluids is selected with said selector valve;

wherein said connection bridge spans a tolerance gap between said selector valve and said venturi eductor plug to prevent fluid flowing through said passage from entering said tolerance gap.

* * * * *